US009796913B2

(12) United States Patent
Prakash et al.

(10) Patent No.: US 9,796,913 B2
(45) Date of Patent: Oct. 24, 2017

(54) LOW RESIDUE, HIGH SALINITY FRACTURING FLUIDS

(71) Applicant: Halliburton Energy Services, Inc., Houston, TX (US)

(72) Inventors: Chetan Prakash, Pune (IN); Anant Kanhoba Ghumare, Nashik (IN); Tzoni Trifonov Raykov, Celle (DE)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/115,490

(22) PCT Filed: May 28, 2014

(86) PCT No.: PCT/US2014/039677
§ 371 (c)(1),
(2) Date: Jul. 29, 2016

(87) PCT Pub. No.: WO2015/183249
PCT Pub. Date: Dec. 3, 2015

(65) Prior Publication Data
US 2017/0137700 A1  May 18, 2017

(51) Int. Cl.
| | |
|---|---|
| *E21B 43/22* | (2006.01) |
| *C09K 8/68* | (2006.01) |
| *C09K 8/80* | (2006.01) |
| *C09K 8/88* | (2006.01) |
| *C09K 8/90* | (2006.01) |
| *C09K 8/528* | (2006.01) |
| *C09K 8/60* | (2006.01) |
| *E21B 43/26* | (2006.01) |
| *E21B 43/267* | (2006.01) |

(52) U.S. Cl.
CPC ............. *C09K 8/685* (2013.01); *C09K 8/528* (2013.01); *C09K 8/605* (2013.01); *C09K 8/80* (2013.01); *C09K 8/887* (2013.01); *C09K 8/90* (2013.01); *E21B 43/26* (2013.01); *E21B 43/267* (2013.01); *C09K 2208/12* (2013.01); *C09K 2208/24* (2013.01); *C09K 2208/26* (2013.01)

(58) Field of Classification Search
CPC .......... C09K 8/685; C09K 8/68; C09K 8/887; C09K 8/90; C09K 2208/26; C09K 8/80; C09K 8/512; C09K 8/805; E21B 43/26; E21B 43/267; E21B 37/06; E21B 43/16; E21B 33/138
See application file for complete search history.

(56) References Cited

U.S. PATENT DOCUMENTS 4,488,975 A   12/1984  Almond
5,350,528 A    9/1994  Westland et al.
(Continued)

OTHER PUBLICATIONS

International Search Report and Written Opinion for PCT/US2014/039677 dated Feb. 26, 2015.

*Primary Examiner* — Zakiya W Bates
(74) *Attorney, Agent, or Firm* — McDermott Will & Emery LLP

(57) ABSTRACT

Low residue, high salinity fracturing fluids may be produced by hydrating a gelling agent comprising carboxymethyl hydroxypropyl guar (CMHPG) in an aqueous fluid having a total dissolved solids concentration of about 30,000 ppm or greater and a pH of about 5 to about 8; adjusting the pH of the aqueous fluid to about 9 to about 10; and then, adding a zirconate crosslinker to the aqueous fluid to yield a crosslinked-CMHPG.

19 Claims, 6 Drawing Sheets

(56) References Cited

U.S. PATENT DOCUMENTS

| | | |
|---|---|---|
| 6,640,898 B2 | 11/2003 | Lord et al. |
| 6,737,386 B1 | 5/2004 | Moorhouse et al. |
| 6,911,419 B2 | 6/2005 | Lord et al. |
| 2007/0111897 A1 | 5/2007 | Dahanayake et al. |
| 2007/0187098 A1 | 8/2007 | Putzig |
| 2009/0221453 A1 | 9/2009 | Mukhopadhyay et al. |
| 2010/0311621 A1 | 12/2010 | Kesavan et al. |

LOW RESIDUE, HIGH SALINITY FRACTURING FLUIDS

BACKGROUND

The exemplary embodiments described herein relate to low residue, high salinity fracturing fluids.

Aqueous gel fluids are used to treat subterranean formations penetrated by wellbores in a variety of ways. For example, such fluids may be used to temporarily plug or block a portion of a formation to allow a gravel pack to be placed in the formation. Aqueous gel fluids may also be used to fracture subterranean formations in order to stimulate the production of fluids, such as hydrocarbons, therefrom.

In a fracturing treatment, an aqueous gel fluid may be injected down the wellbore at a pressure sufficient to develop hydraulic forces that create or extend at least one fracture in the formation. The gel quality of the fluid aids in both the suspension of proppant material in the fluid and the formation of the fracture. Elevated pressure is maintained on the fluid for a sufficient time to cause movement of the fluid into the fracture and thereby propagate or extend the fracture into the formation. The proppant material in the fluid may deposit in the fracture so as to hold the fracture open upon release of the pressure. Crosslinking agents may be used to increase the viscosity of the fluid, which facilitates transport and placement of the proppant material and the formation of an extended fracture.

In some instances, it may be desirable to recover the aqueous gel fluid from the formation once the treatment is complete and prior to initiating or resuming hydrocarbon production. In order to recover the fluid, it may be necessary to first reduce the viscosity of the fluid by causing the gelling agents in the fluid to break down, which is commonly referred to as "breaking" the gel.

In some instances, the process of breaking the aqueous gel fluid creates microscopic gel fragments, often referred to as "gel residue." Gel residue may, in some instances, agglomerate or flocculate and form relatively large broken gel masses. These masses can severely damage the formation. For example, the masses may plug the interstitial spaces of a proppant pack formed in a fracture and may severely reduce the flow of fluids therethrough, which reduces hydrocarbon production from the formation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
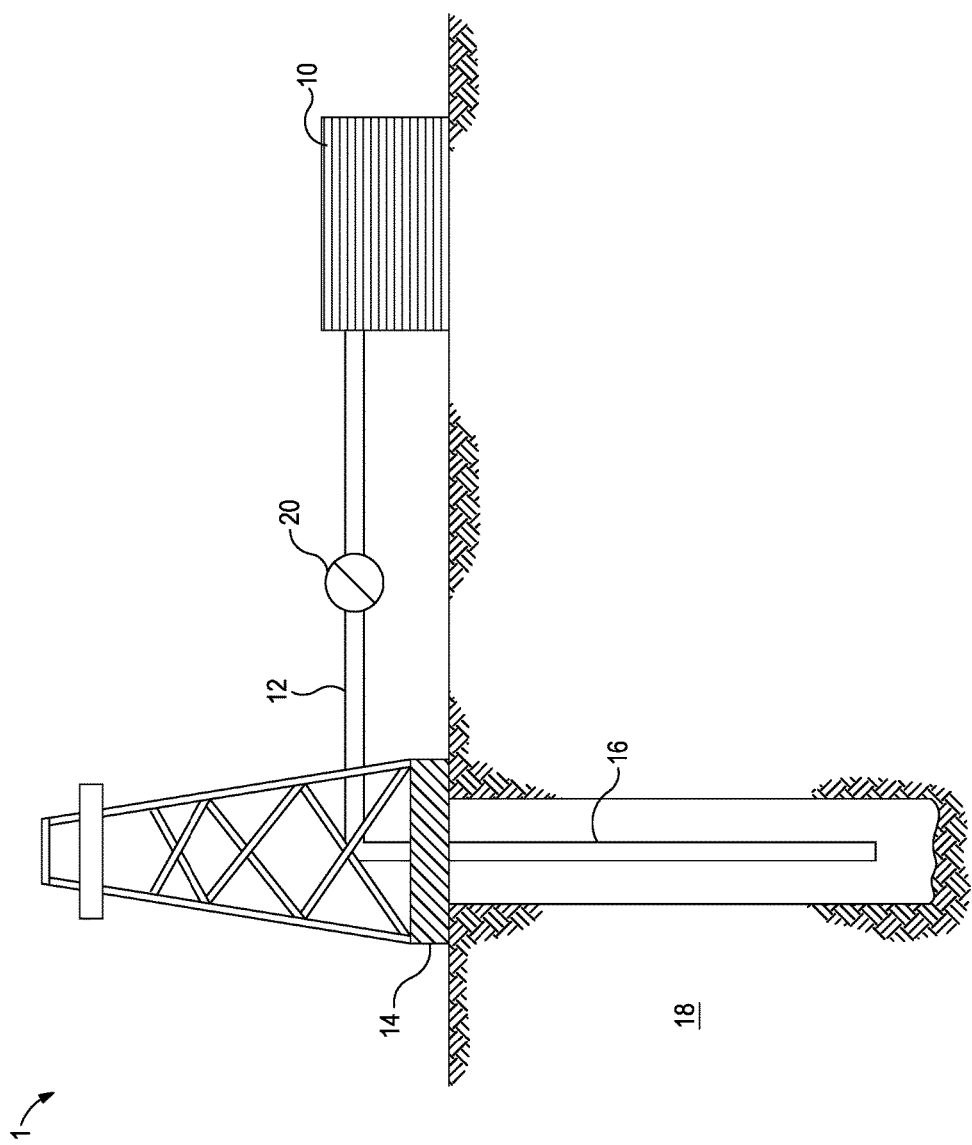
FIG. 1 shows an illustrative schematic of a system that can deliver fluids of the present disclosure to a downhole location, according to one or more embodiments.

The exemplary embodiments described herein relate to low residue, high salinity fracturing fluids.

In some instances, especially in an offshore well site, the supply of fresh water or low salinity water is insufficient for the fluid volumes needed for fracturing. Additionally, supplying remote sites with such water may be very expensive. As such, fracturing fluids may utilize high salinity fluids (e.g., having a total dissolved solids (TDS) concentration of about 30,000 ppm or greater) like seawater as the base fluid. The increased salinity of the base fluid reduces the types of gelling agents available for use to produce a gelled aqueous fluid sufficient for fracturing. In some instances, crosslinked guar and crosslinked hydroxypropyl guar have been used as gelling agents. However, these gelling agents may be suitable for use at temperatures up to about 200° F., and in a few instances up to about 300° F., before the viscosity is reduced to a point where the gelling agent is insufficient for fracturing operations. Further, upon breaking, these gelling agents typically produce significant residue, which as described above may reduce subsequent hydrocarbon production.

It has been discovered that a low residue gelling agent, carboxymethylhydroxypropylguar (CMHPG), can be used to gel high salinity and displays viscosities suitable for fracturing fluids to temperatures greater than about 325° F. This is an unexpected result because it generally requires a pH greater than about 10 to crosslink CMHPG with a zirconate crosslinker. However, in a high salinity fluid, the magnesium and calcium start precipitating above pH 10. In some embodiments, the methods described herein provide for crosslinking CMHPG with a zirconate crosslinker at less than pH 10 and, in some instances, less than pH 9.5, in high salinity fluids like seawater.

Some embodiments may involve hydrating a CMHPG gelling agent in an aqueous fluid having a TDS of about 30,000 ppm or greater (e.g., seawater) at a pH of about 5 to about 8 (or about 6 to about 8 or about 6.5 to about 7.5), then adjusting the pH to about 9 to about 10 (i.e., about pH 9-10) (or about 9 to about 9.5) and crosslinking the hydrated CMHPG gelling agent with a zirconate crosslinker. As used herein, the term "CMHPG gelling agent" refers to a gelling agent comprising CMHPG.

In some embodiments, hydrating the CMHPG gelling agent may be for at least 10 minutes. In some embodiments, hydrating the CMHPG gelling agent may be for at least 30 min. In some embodiments, hydrating the CMHPG gelling agent may be for at least 1 hour.

In some embodiments, the aqueous fluid used during hydration of the CMHPG gelling agent may have a TDS ranging from a lower limit of about 30,000 ppm, 40,000 ppm, or 50,000 ppm to an upper limit of about 100,000 ppm or 75,000 ppm, and wherein the TDS may range from any lower limit to any upper limit and encompasses any subset therebetween. In some embodiments, the aqueous fluid may be seawater. In some embodiments, the aqueous fluid may be a brine.

In some embodiments, the aqueous fluid may be adjusted to a pH of about 5 to about 8 (or about 6 to about 8 or about 6.5 to about 7.5) for hydration of the CMHPG gelling agent. This may be achieved with acids (e.g., acetic acid), bases, and buffers as needed based on the original pH of the aqueous fluid. In some embodiments, the aqueous fluid used during hydration of the CMHPG gelling agent may be buffered to a pH of about 5 to about 8 (or about 6 to about 8 or about 6.5 to about 7.5). For example, an ammonium acetate buffer may be used.

In some embodiments, the CMHPG may have a molecular weight of about 100,000, 250,000, or 500,000 to about 4,000,000, 2,000,000 or 1,000,000, and wherein the molecular weight may range from any lower limit to any upper limit and encompasses any subset therebetween.

In some embodiments, the CMHPG gelling agent may be included in the aqueous fluid in a concentration ranging from a lower limit of about 0.1%, 0.2%, or 0.5% by weight of the aqueous fluid to an upper limit of 10%, 5%, 2%, or 1% by weight of the aqueous fluid, and wherein the concentration of CMHPG gelling agent may range from any lower limit to any upper limit and encompasses any subset therebetween.

In some embodiments, during, before, or after hydrating the CMHPG gelling agent, additives like biocides, bactericides, clay stabilizing agents (i.e., additives that reduce or mitigate swelling of swellable clays), and scale inhibitors may be added to the aqueous fluid.

Examples of biocides and bactericides may include, but are not limited to, 2,2-dibromo-3-nitrilopropionamide, 2-bromo-2-nitro-1,3-propanediol, sodium hypochlorite, and the like, and any combination thereof. In some embodiments, the biocides and bactericides may be included in the aqueous fluid in an amount in the range of from about 0.001% to about 0.1% by weight of the aqueous fluid, including any subset therebetween.

Examples of clay stabilizing agents may include, but are not limited to, potassium chloride, cationic polymers (e.g., polydialkyldiallyl polymers, a quaternary ammonium salt of polyethyleneimine polymers, a quaternary ammonium salt of polydimethylaminoethyl-methacrylate copolymers, a quaternary ammonium salt of polyN-(3-dimethylaminopropyl)acrylamide polymers, poly(dimethyldiallylammonium chloride), cationic co-polymers of poly(acrylamide), and cationic poly(diemethylaminoethylmethacrylate)), and the like, and any combination thereof. In some embodiments, the clay stabilizing agents may be included in the aqueous fluid in an amount in the range of from about 0.1% to about 5% by weight of the aqueous fluid, including any subset therebetween.

Examples of scale inhibitors may include, but are not limited to, bis(hexamethylene triamine penta(methylene phosphonic acid)), diethylene triamine penta(methylene phosphonic acid), ethylene diamine tetra(methylene phosphonic acid), hexamethylenediamine tetra(methylene phosphonic acid), 1-hydroxy ethylidene-1,1-diphosphonic acid, 2-hydroxyphosphonocarboxylic acid, 2-phosphonobutane-1,2,4-tricarboxylic acid, phosphino carboxylic acid, diglycol amine phosphonate, aminotris(methanephosphonic acid), a methylene phosphonate, a phosphonic acid, an aminoalkylene phosphonic acid, an aminoalkyl phosphonic acid, a polyphosphate, a salt thereof, and the like, and any combination thereof. In some embodiments, the scale inhibitors may be included in the aqueous fluid in an amount in the range of from about 0.001% to about 0.1% by weight of the aqueous fluid, including any subset therebetween.

In some embodiments, adjusting the pH of the aqueous fluid to about 9 to about 10 after hydration of the CMHPG gelling agent may involve adding a base, a basic buffer, or a combination thereof. Examples of suitable bases may include, but are not limited to, sodium hydroxide, potassium hydroxide, and the like, and any combination thereof. Examples of suitable basic buffers may include, but are not limited to, potassium carbonate, sodium carbonate, and the like, and any combination thereof.

The amount of base or basic buffer added to the aqueous fluid after hydration of the CMHPG gelling agent may be an amount sufficient to adjust the pH to about 9 to about 10 (or about 9.0 to about 9.5). The amount may depend on, inter alia, the concentration of the base or basic buffer, the pH of the aqueous fluid after hydration of the CMHPG gelling agent, the TDS concentration, and the like.

In some embodiments, after hydrating the CMHPG gelling agent and before adjusting the pH to about 9 to about 10, additives like emulsion breakers may be added to the aqueous fluid.

Examples of emulsion breakers may include, but are not limited to, a combination of terpene and an ethoxylated alcohol, ethoxylated nonyl phenols, octyl phenol polyethoxyethanol, potassium myristate, potassium stearylsulfate, sodium lauryl sulfonate, polyoxyethylene alkyl phenol, polyoxyethylene, polyoxyethylene (20 mole) stearyl ether, and N-cetyl N-ethyl morpholinium ethosulfate, and the like, and any combination thereof. In some embodiments, the emulsion breakers may be included in the aqueous fluid in an amount in the range of from about 0.001% to about 5% by weight of the aqueous fluid, including any subset therebetween.

In some embodiments, after adjusting the pH of the aqueous fluid to about 9 to about 10, a zirconate crosslinker may be added to the aqueous fluid. Examples of zirconate crosslinkers may include, but are not limited to, ammonium zirconium fluoride, zirconium 2-ethylhexanoate, zirconium acetate, zirconium neodecanoate, zirconium acetylacetonate, tetrakis(triethanolamine) zirconate, zirconium carbonate, ammonium zirconium carbonate, zirconyl ammonium carbonate, zirconium complex of hydroxyethyl glycine, zirconium malonate, zirconium propionate, zirconium lactate, zirconium acetate lactate, and zirconium tartrate, zirconium oxychloride, zirconium N-peroxide, and the like, and any combination thereof. In some embodiments, the emulsion breakers may be included in the aqueous fluid in an amount in the range of from about 0.001% to about 1% by weight of the aqueous fluid, including any subset therebetween.

In some embodiments, after adjusting the pH of the aqueous fluid to about 9 to about 10, additives like a gel breaker, a gel breaker activator, a crosslinker activator, and a gel stabilizer may be added to the aqueous fluid.

Examples of gel breakers may include, but are not limited to, peroxides, persulfates, perborates, oxyacids and oxyanions of halogens, enzyme breakers, and the like, and any combination thereof. Exemplary oxyacids and oxyanions of chlorine, for example, may include hypochlorous acid and hypochlorites, chlorous acid and chlorites, chloric acid and chlorates, and perchloric acid and perchlorate. Exemplary enzyme breakers, for example, may include hemicellulase, a glucoside oxidizing enzyme, and an oxidase enzyme breaker. In some embodiments, the gel breakers may be included in the aqueous fluid in an amount in the range of from about 0.001% to about 1% by weight of the aqueous fluid, including any subset therebetween.

Examples of gel breaker activators may include, but are not limited to, a metal (e.g., iron or an iron salt) in combination with a protein, cobaltous acetate-ethylenediaminetetraacetic acid sodium salt, copper-ethylene diamine tetra acetic acid complex, thioglycolic acid-sodium molybdate, and the like, and any combination thereof. In some embodiments, the gel breaker activators may be included in the aqueous fluid in an amount in the range of from about 0.001% to about 1% by weight of the aqueous fluid, including any subset therebetween.

Examples of crosslinker activators may include, but are not limited to, sodium octaborate, potassium metaborate, and the like, and any combination thereof. In some embodiments, the crosslinker activators may be included in the aqueous fluid in an amount in the range of from about 0.001% to about 1% by weight of the aqueous fluid, including any subset therebetween.

Examples of gel stabilizers may include, but are not limited to, sodium thiosulfate, isoascorbate, erythroborate, and the like, and any combination thereof. In some embodiments, the gel stabilizers may be included in the aqueous fluid in an amount in the range of from about 0.001% to about 1% by weight of the aqueous fluid, including any subset therebetween.

In some embodiments, the viscosity of the aqueous fluid having the crosslinked-CMHPG dispersed therein may be stable (i.e., maintains an apparent viscosity of about 200 cP or greater at a constant shear rate of 40 $s^{-1}$) for extended periods of time at elevated temperatures. For example, the aqueous fluid may be stable for at least 45 minutes (or at least 75 minutes, or at least 120 minutes) at 200° F. (or at 300° F.). The apparent viscosity may be measured using a Chandler 5550 High Pressure, High Temperature (HPHT) Viscometer using an R1 rotor and B5X bob with a ramp time of 10 minutes.

After crosslinking the CMHPG gelling agent, the aqueous fluid may be introduced into a wellbore penetrating a subterranean formation. In some instances, the aqueous fluid may be a portion of a fracturing fluid, which may optionally also include proppant particles.

Examples of proppant particulates may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh or less on the U.S. Sieve Series; however, in certain circumstances, other sizes or mixtures of sizes may be desired and will be entirely suitable for practice of the embodiments described herein. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments described herein. In certain embodiments, the particulates may be present in the fluids described herein in an amount in the range of from about 0.5 pounds per gallon ("ppg") to about 30 ppg by volume of the aqueous fluid.

In some embodiments, the aqueous fluid (or fracturing fluid) may be introduced into a wellbore penetrating a subterranean formation at a pressure sufficient to create or extend at least one fracture in the subterranean formation. In some instances, where proppant particles are included, a proppant pack may be formed in at least a portion of the fracture.

In some embodiments, the wellbore may have a bottom hole static temperature (BHST) of about 200° F. or greater. In some embodiments, the wellbore may have a BHST ranging from a lower limit of about 120° F., 150° F., or 200° F. to an upper limit of about 350° F., 325° F., 300° F., or 250° F., and wherein the BHST may range from any lower limit to any upper limit and encompasses any subset therebetween.

In various embodiments, systems configured for delivering the fluids described herein to a downhole location are described. In various embodiments, the systems can comprise a pump fluidly coupled to a tubular, the tubular containing a fluid (e.g., a fracturing fluid) that comprises an aqueous fluid having zirconate-crosslinked CMHPG gelling agents dispersed therein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluid to the high pressure pump. In such embodiments, the low pressure pump may "step up" the pressure of the fluid before it reaches the high pressure pump.

In some embodiments, the systems described herein can further comprise a mixing tank that is upstream of the pump and in which the fluid is formulated. In various embodiments, the pump (e.g., a low pressure pump, a high pressure pump, or a combination thereof) may convey the fluid from the mixing tank or other source of the fluid to the tubular. In other embodiments, however, the fluid can be formulated offsite and transported to a worksite, in which case the fluid may be introduced to the tubular via the pump directly from its shipping container (e.g., a truck, a railcar, a barge, or the like) or from a transport pipeline. In either case, the fluid may be drawn into the pump, elevated to an appropriate pressure, and then introduced into the tubular for delivery downhole.

FIG. 1 shows an illustrative schematic of a system that can deliver fluids described herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a fluid described herein may be formulated. The fluid may be conveyed via line 12 to wellhead 14, where the fluid enters tubular 16, tubular 16 extending from wellhead 14 into subterranean formation 18. Upon being ejected from tubular 16, the fluid may subsequently penetrate into subterranean formation 18. In some instances, tubular 16 may have a plurality of orifices (not shown) through which the fluid of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the fluid may, in some embodiments, flow back to wellhead 14 and exit subterranean formation 18. In some embodiments, the fluid that has flowed back to wellhead 14 may subsequently be recovered and recirculated to subterranean formation 18.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. a method that includes hydrating a gelling agent comprising CMHPG in an aqueous fluid having a total dissolved solids concentration of about 30,000 ppm or greater and a pH of about 5 to about 8; adjusting the pH of the aqueous fluid to about 9 to about 10; and then, adding a zirconate crosslinker to the aqueous fluid to yield a crosslinked-CMHPG;

B. a method that includes hydrating a gelling agent comprising CMHPG in an aqueous fluid having a total dissolved solids concentration of about 30,000 ppm or greater and a pH of about 6.5 to about 7.5; adjusting the pH of the aqueous fluid to about 9.0 to about 9.5; then, adding a zirconate crosslinker to the aqueous fluid to yield a crosslinked-CMHPG; and introducing the crosslinked-CMHPG dispersed in the aqueous fluid into a wellbore penetrating a subterranean formation; and C. a system that includes a wellhead with a tubular extending therefrom and into a wellbore in a subterranean formation; and a pump fluidly coupled to a tubular, the tubular containing an aqueous fluid with a zirconate-crosslinked CMHPG disperse therein, wherein the aqueous fluid has a total dissolved solids concentration of about 30,000 ppm or greater and a pH of about 5 to about 8.

Each of embodiments A, B, and C may have one or more of the following additional elements in any combination: Element 1: wherein the CMHPG in the aqueous fluid having a pH of about 5 to about 8 (or a pH of about 6.5 to about 7.5) is at a concentration of about 0.1% to about 10% by weight of the aqueous fluid; Element 2: wherein the zirconate crosslinker is at a concentration of about 0.001% to about 1% by weight of the aqueous fluid; Element 3: wherein the aqueous fluid having a pH of about 5 to about 8 (or a pH of about 6.5 to about 7.5) has dispersed therein at least one selected from the group consisting of: a biocide, a bactericide, a clay control agent, and a scale inhibitor; Element 4: wherein the aqueous fluid having the crosslinked-CMHPG dispersed therein at about 200° F. maintains an apparent viscosity of about 200 cP or greater at a constant shear rate of 40 $s^{-1}$ for about 45 minutes or greater; Element 5: wherein the aqueous fluid having the crosslinked-CMHPG dispersed therein at about 200° F. maintains an apparent viscosity of about 200 cP or greater at a constant shear rate of 40 $s^{-1}$ for about 75 minutes or greater; Element 6: wherein the aqueous fluid having the crosslinked-CMHPG dispersed therein at about 300° F. maintains an apparent viscosity of about 200 cP or greater at a constant shear rate of 40 $s^{-1}$ for about 75 minutes or greater; and Element 7: wherein the aqueous fluid having the crosslinked-CMHPG dispersed therein at about 300° F. maintains an apparent viscosity of about 200 cP or greater at a constant shear rate of 40 $s^{-1}$ for about 120 minutes or greater. By way of non-limiting example, exemplary combinations applicable to A, B, C include: Element 1 in combination with at least one of Elements 4-6; Element 2 in combination with at least one of Elements 4-6; Element 3 in combination with at least one of Elements 4-6; and Element 1 and 2 in combination.

Each of embodiments A and B may have one or more of the following additional elements in any combination: Element 8: the method further including adding a crosslinker activator to the aqueous fluid after adjusting the pH to about 9 to about 10 (or to about 9.0 to about 9.5); Element 9: the method further including adding a gel breaker to the aqueous fluid after adjusting the pH to about 9 to about 10 (or to about 9.0 to about 9.5); Element 10: the method further including adding a gel breaker activator to the aqueous fluid after adjusting the pH to about 9 to about 10 (or to about 9.0 to about 9.5); Element 11: the method further including adding a gel stabilizer to the aqueous fluid after adjusting the pH to about 9 to about 10 (or to about 9.0 to about 9.5); and Element 12: the method further including adding proppant particulates to the aqueous fluid comprising the crosslinked-CMHPG. By way of non-limiting example, exemplary combinations applicable to A and B include: at least two of Elements 9-11 in combination; at least one of Elements 9-11 in combination with Element 12; and at least one of Elements 9-12 in combination with at least one of Elements 1-7 including the foregoing combinations.

Embodiments A including any of the foregoing Elements or foregoing combinations of Elements may further include: Element 13: the method further including introducing the crosslinked-CMHPG dispersed in the aqueous fluid into a wellbore penetrating a subterranean formation.

Each of embodiments B and C including any of the foregoing Elements or foregoing combinations of Elements may further include: Element 14: wherein the wellbore has a bottom hole static temperature of about 200° F. or greater; and Element 15: wherein the wellbore has a bottom hole static temperature of about 300° F. or greater.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments described herein. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the embodiments disclosed herein are presented herein. Not all features of a physical implementation are described or shown in this application for the sake of clarity. It is understood that in the development of a physical embodiment incorporating the embodiments described herein, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1

The rheological properties were tested for four fluids prepared according to Table 1 using a Chandler 5550 HPHT Viscometer at 200° F. using an R1 rotor and B5X bob combination at a constant shear rate of 40 s$^{-1}$ with a 10 minute ramp time.

TABLE 1

| Order of Addition | Component | Fluid 1 | Fluid 2 | Fluid 3 | Fluid 4 |
|---|---|---|---|---|---|
| 1 | Black Sea water | base fluid | base fluid | base fluid | base fluid |
| 2 | 2,2-dibromo-3-nitrilopropionamide (lb/Mgal[1]) | — | — | — | 0.15 |
| 3 | 2-bromo-2-nitro-1,3-propanediol (lb/Mgal) | — | — | — | 0.15 |
| 4 | KCl (% w/v) | 1% | 1% | 1% | 3% |
| 5 | polyacrylic acid solution (gal/Mgal) | — | — | — | 0.5 |
| 6 | CMHPG (lb/Mgal) | 27.5 | 27.5 | 27.5 | 27.5 |
| 7 | acetic acid/ammonium acetate buffer (gal/Mgal) | 0.2 | 0.2 | 0.2 | — |
| | allow 30 minutes for hydration of the CMHPG | | | | |
| 8 | GASPERM1000M ™[2] (gal/Mgal) | 1.5 | 1.5 | 1.5 | 1.5 |
| 9 | potassium carbonate buffer (gal/Mgal) | 3 | 3 | 3 | 3 |
| | measured pH | 9.78 | 9.82 | 9.8 | 9.86 |
| 10 | copper-ethylene diamine tetra acetic acid complex (gal/Mgal) | — | — | 0.1 | — |
| 11 | a chlorous acid solution (gal/Mgal) | — | 10 | 10 | 10 |
| 12 | sodium octaborate (lb/Mgal) | 0.5 | 0.5 | 0.5 | 0.5 |
| 13 | triethanolamine zirconate (gal/Mgal) | 0.3 | 0.25 | 0.3 | 0.25 |
| | heat mixture at 150° F. for 30 min | | | | |
| | measured pH | 9.30 | 9.28 | 9.27 | 9.35 |
| | measure rheological properties | | | | |
| | measured pH | 9.10 | 9.05 | 9.03 | 9.16 |

[1]Mgal = 1000 gallons of base fluid
[2]a microemulsion surfactant, available from Halliburton Energy Services, Inc.

Figure 2:
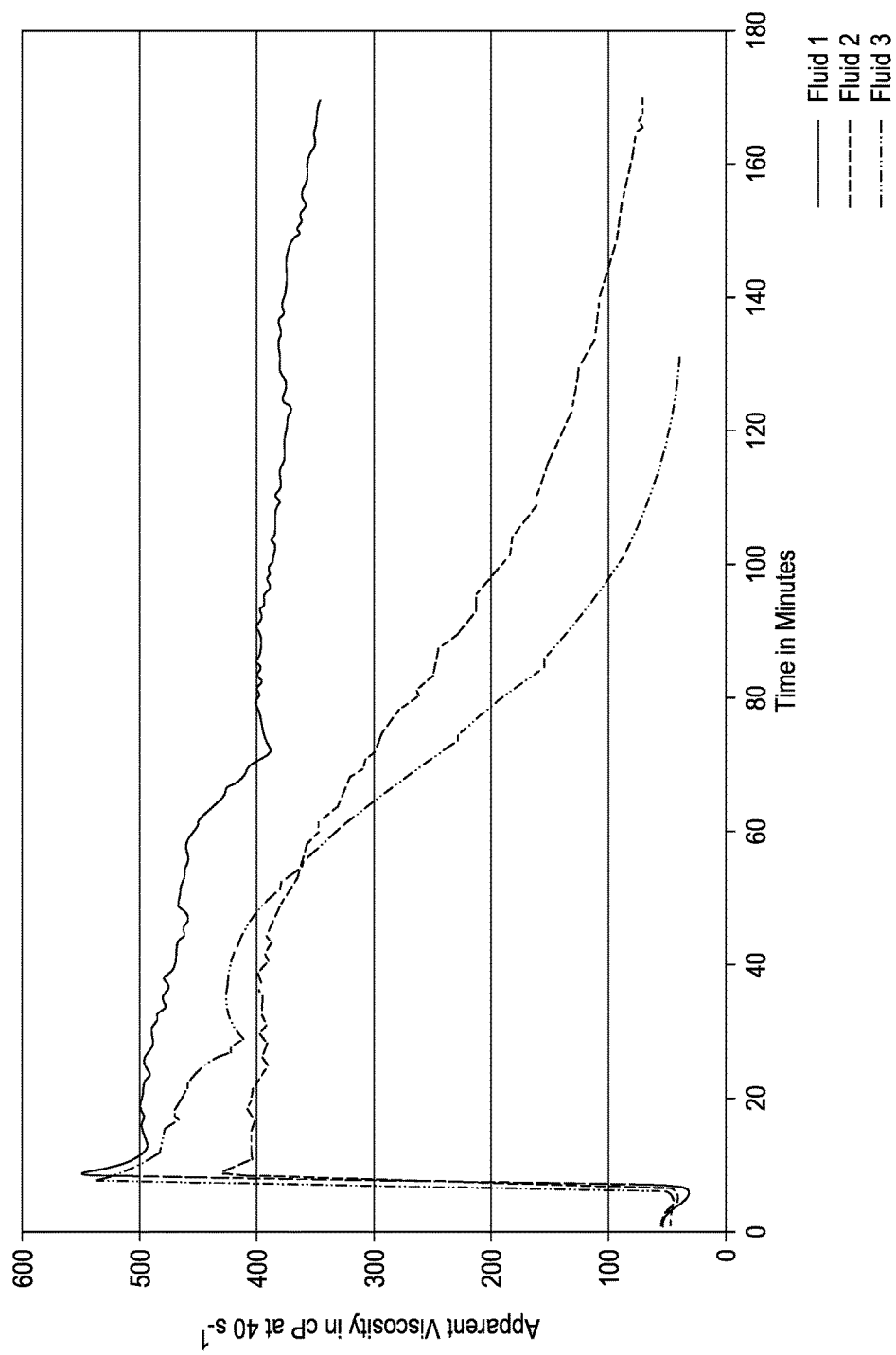
FIG. 2 provides rheological data for high salinity fluids viscosified with zirconate-crosslinked CMHPG gelling agents according to at least some embodiments described herein.
Figure 3:
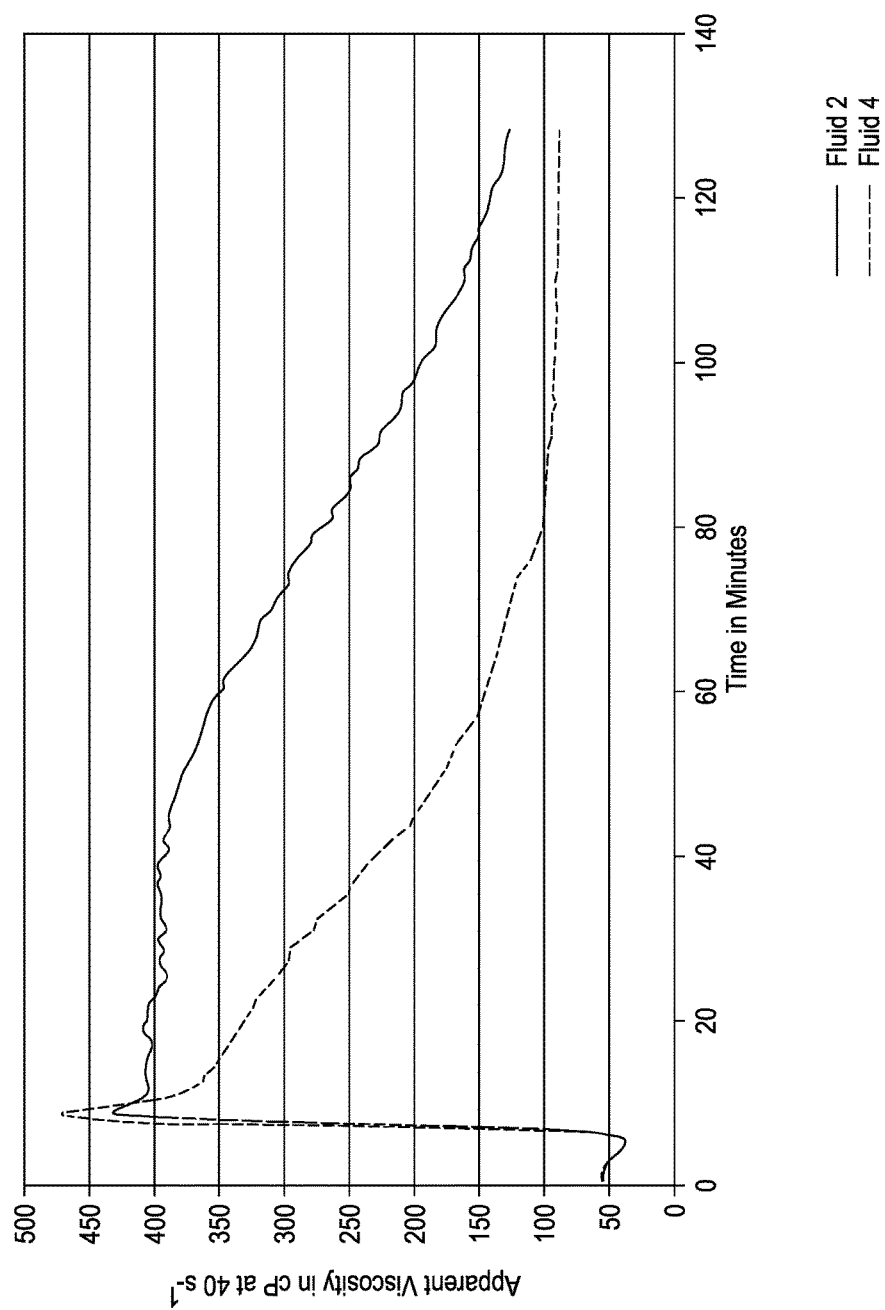
FIG. 3 provides rheological data for high salinity fluids viscosified with zirconate-crosslinked CMHPG gelling agents according to at least some embodiments described herein.

FIG. 2 provides the apparent viscosity measurements for Fluids 1, 2, and 3. FIG. 3 provides the apparent viscosity measurements for Fluids 2 and 4. Fluid 1 is stable (i.e., maintains an apparent viscosity of about 200 cP or greater at a constant shear rate of 40 s$^{-1}$) for greater than 170 minutes, Fluid 2 is stable for about 97 minutes, Fluid 3 is stable for about 78 minutes, and Fluid 4 is stable for about 45 minutes.

This example demonstrates that high salinity fluids may be viscosified with zirconate-crosslinked CMHPG gelling agents, and that the viscosified fluids are stable at elevated temperatures for extended periods of time.

Example 2

The rheological properties were tested for four fluids prepared according to Table 2 using a Chandler 5550 HPHT Viscometer at varying temperatures using an R1 rotor and B5X bob combination at a constant shear rate of 40 s$^{-1}$.

TABLE 2

| Order of Addition | Component | Fluid 5 | Fluid 6 | Fluid 7 | Fluid 8 | Fluid 9 | Fluid 10 |
|---|---|---|---|---|---|---|---|
| 1 | Black Sea water | base fluid | base fluid | base fluid | base fluid | base fluid | base fluid |
| 2 | 2,2-dibromo-3-nitrilopropionamide (lb/Mgal) | — | — | — | — | — | 0.15 |
| 3 | 2-bromo-2-nitro-1,3-propanediol (lb/Mgal) | — | — | — | — | — | 0.15 |
| 4 | KCl (% w/v) | 1% | 1% | 1% | 1% | 1% | 3% |
| 5 | polyacrylic acid solution (gal/Mgal) | — | — | — | — | — | 0.5 |
| 6 | CMHPG (lb/Mgal) | 45 | 50 | 50 | 50 | 50 | 50 |

TABLE 2-continued

| Order of Addition | Component | Fluid 5 | Fluid 6 | Fluid 7 | Fluid 8 | Fluid 9 | Fluid 10 |
|---|---|---|---|---|---|---|---|
| 7 | acetic acid/ammonium acetate buffer (gal/Mgal) | 0.2 | 0.2 | 0.2 | 0.2 | 0.2 | — |
| | allow 30 minutes for hydration of the CMHPG | | | | | | |
| 8 | GASPERM1000M ™ (gal/Mgal) | 1.5 | 1.5 | 1.5 | 1.5 | 1.5 | 1.5 |
| 9 | potassium carbonate buffer (gal/Mgal) | 3 | 3 | 3 | 3 | 3 | 3 |
| | measured pH | 9.78 | 9.82 | 9.8 | 9.76 | 9.82 | 9.76 |
| 10 | sodium thiosulfate (gal/Mgal) | 1.5 | 6 | 9 | 9 | 9 | 9 |
| 11 | a chlorous acid solution (gal/Mgal) | — | 0.25 | 0.1 | 0.1 | 0.1 | 0.1 |
| 12 | sodium octaborate (lb/Mgal) | 0.5 | 0.5 | 0.5 | 0.5 | 0.5 | 0.5 |
| 13 | triethanolamine zirconate (gal/Mgal) | 0.35 | 0.45 | 0.5 | 0.5 | 0.5 | 0.5 |
| | heat mixture at 150° F. for 30 min | | | | | | |
| | measured pH | 9.28 | 9.26 | 9.21 | 9.25 | 9.24 | 9.28 |
| | measure rheological properties | | | | | | |
| | measured pH | 9.1 | 9.08 | 8.63 | 8.43 | 8.38 | 9.12 |

Figure 4:
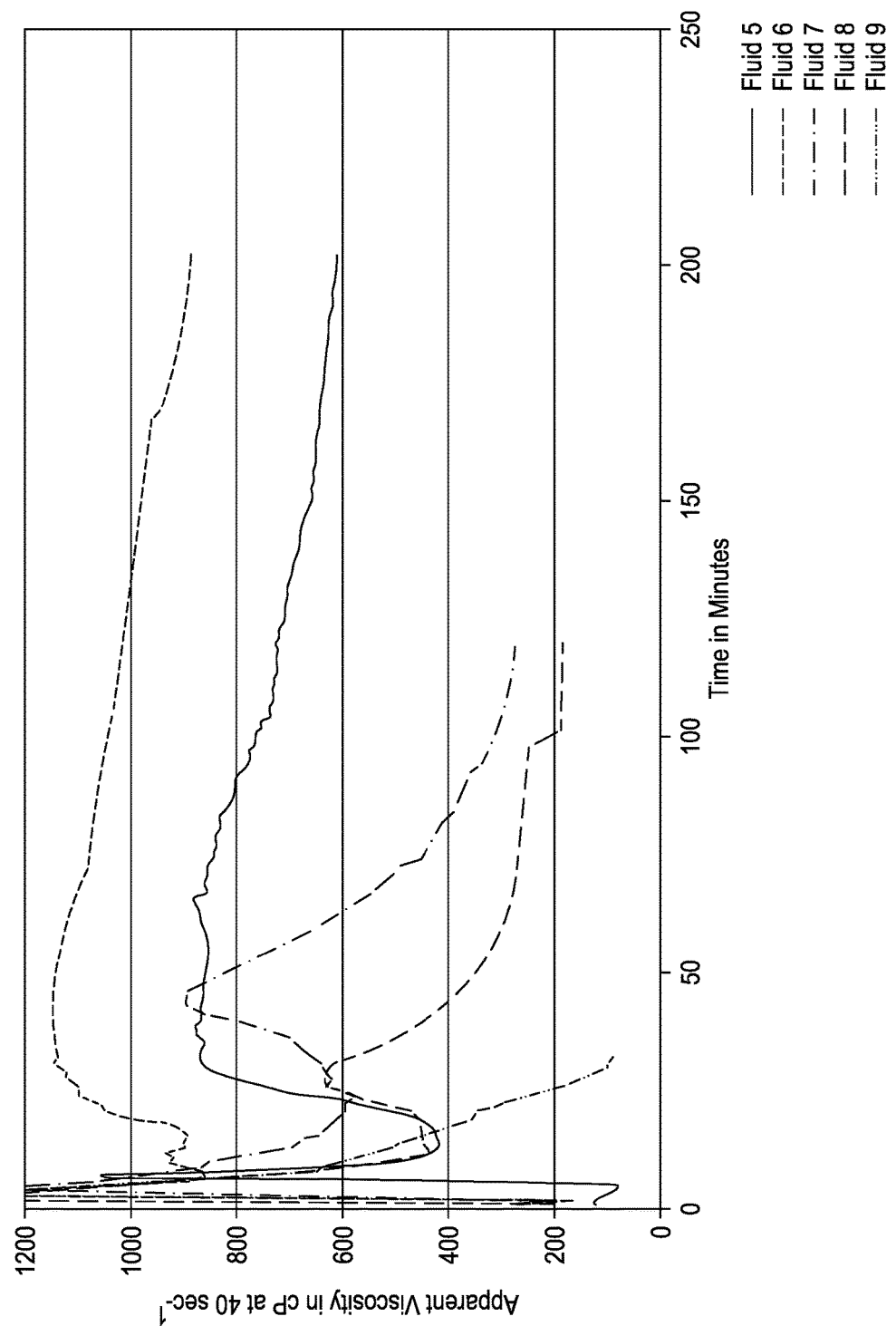
FIG. 4 provides rheological data for high salinity fluids viscosified with zirconate-crosslinked CMHPG gelling agents according to at least some embodiments described herein.
Figure 5:
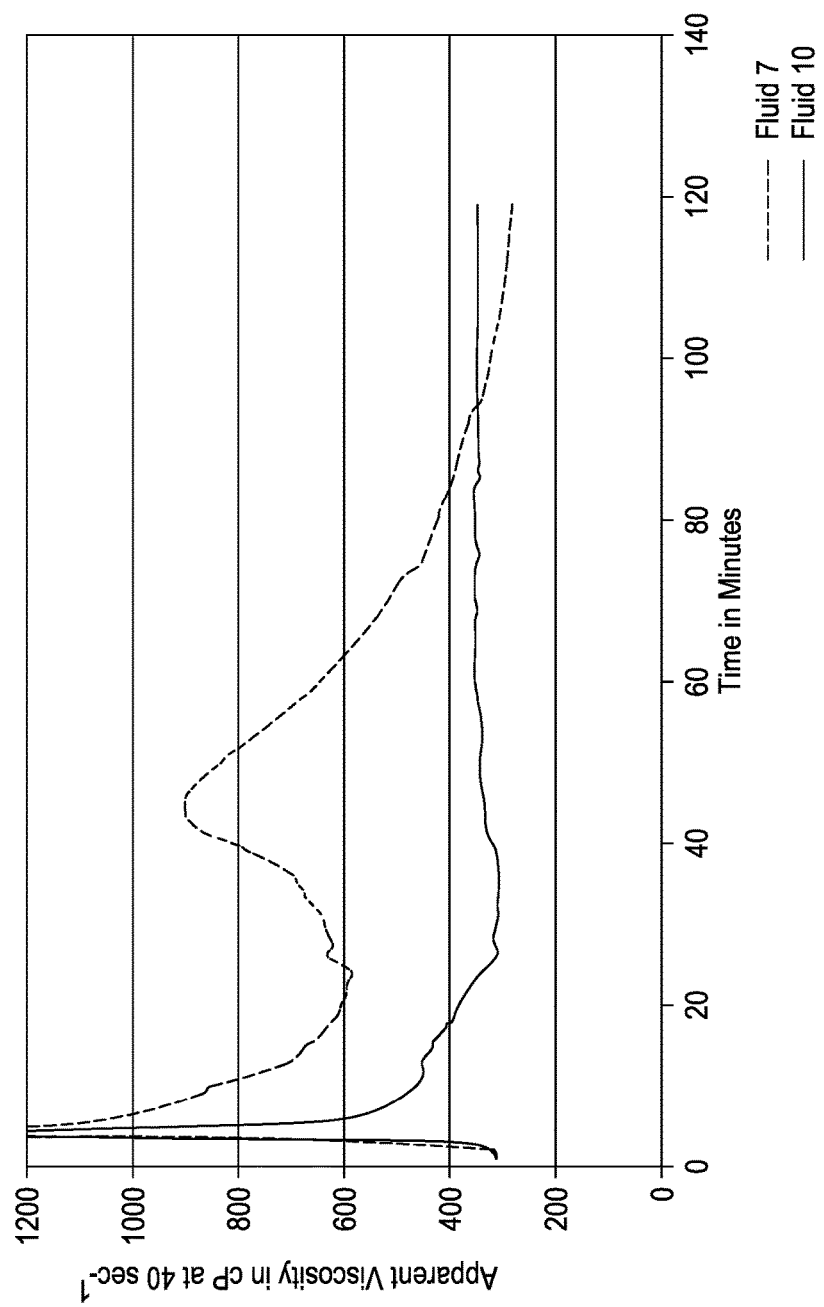
FIG. 5 provides rheological data for high salinity fluids viscosified with zirconate-crosslinked CMHPG gelling agents according to at least some embodiments described herein.

FIG. 4 provides the apparent viscosity measurements for Fluids 5, 6, 7, 8, and 9. FIG. 5 provides the apparent viscosity measurements for Fluids 7 and 10. Fluids 5 and 6 are stable for greater than about 200 minutes, Fluids 7 and 10 are stable for greater than about 120 minutes, Fluid 8 is stable for about 100 minutes, and Fluid 9 is stable for about 25 minutes. As the temperature increases, the fluid becomes less stable as illustrated by comparing Fluids 7, 8, and 9, which have the same composition but are analyzed at different temperatures. Additionally, Fluid 10 illustrates that an example of a complete fracturing fluid composition may be stable for over 2 hours above 300° F.

This example demonstrates that high salinity fluids may be viscosified with zirconate-crosslinked CMHPG gelling agents, and that the viscosified fluids are stable at elevated temperatures for extended periods of time.

Example 3

Figure 6:
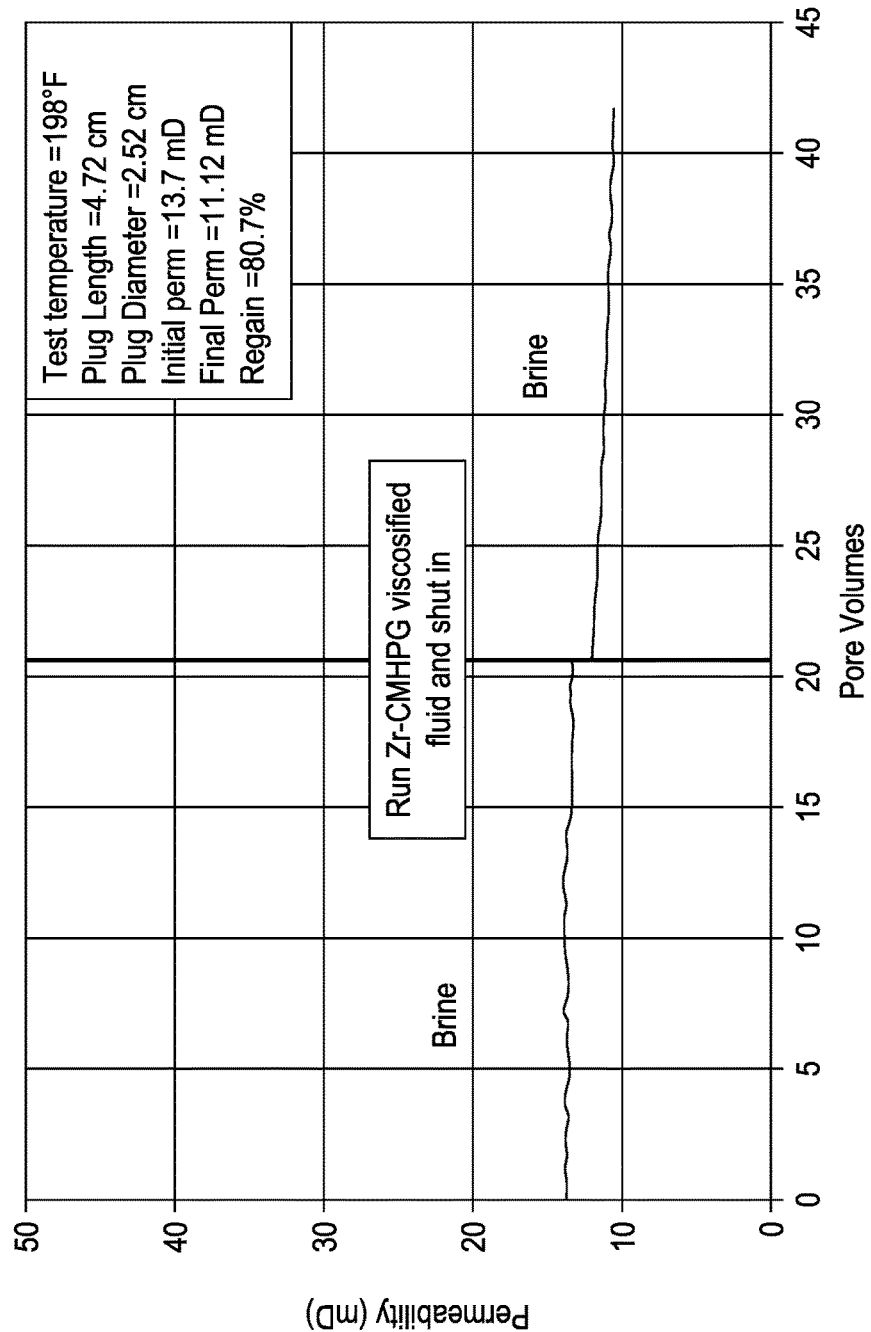
FIG. 6 provides regain permeability data for a high salinity fluid viscosified with zirconate-crosslinked CMHPG gelling agents according to at least some embodiments described herein.

A fluid prepared according to Table 3 was analyzed for regain permeability of a Berea sandstone core. A closure stress of about 1200 psi was maintained across the core sample during the experiment. A 3% KCl brine was flowed through the core sample for about 21 pore volumes where the permeability was measured (FIG. 6, left of the shut in line). Then, 20 pore volumes of the fluid according to Table 3 was flowed through the core and shut in for 12 hours at about 198° F. Then, 3% KCl brine was flowed through the core sample for about 21 pore volumes where the permeability was measured (FIG. 6, right of the shut in line). Before exposure to the test fluid, the permeability was about 14 mD, and after exposure to the test fluid about 11 mD, which is about 80% regain permeability. This example demonstrates that the zirconate-crosslinked CMHPG gelling agents provide for low residue fluids.

TABLE 3

| Order of Addition | Component | |
|---|---|---|
| 1 | seawater | base fluid |
| 2 | KCl (% w/v) | 1% |
| 3 | polyacrylic acid solution (gal/Mgal) | 0.5 |
| 4 | CMHPG (lb/Mgal) | 27.5 |
| 5 | acetic acid/ammonium acetate buffer (gal/Mgal) | — |
| | allow 30 minutes for hydration of the CMHPG | |
| 6 | GASPERM1000M ™ (gal/Mgal) | 1.5 |
| 7 | potassium carbonate buffer (gal/Mgal) | 3 |
| 8 | a chlorous acid solution (gal/Mgal) | 10 |
| 9 | sodium octaborate (lb/Mgal) | 0.5 |
| 10 | triethanolamine zirconate (gal/Mgal) | 0.25 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   hydrating a gelling agent comprising carboxymethyl hydroxypropyl guar (CMHPG) in an aqueous fluid having a total dissolved solids concentration of about 30,000 ppm or greater and a pH of about 5 to about 8;
   adjusting the pH of the aqueous fluid to about 9 to about 10; and
   then, adding a crosslinker activator, a gel breaker, and a zirconate crosslinker to the aqueous fluid to yield a crosslinked-CMHPG.

2. The method of claim 1, wherein the CMHPG in the aqueous fluid having a pH of about 5 to about 8 is at a concentration of about 0.1% to about 10% by weight of the aqueous fluid.

3. The method of claim 1, wherein the zirconate crosslinker is at a concentration of about 0.001% to about 1% by weight of the aqueous fluid.

4. The method of claim 1, wherein the aqueous fluid having a pH of about 5 to about 8 has dispersed therein at least one selected from the group consisting of: a biocide, a bactericide, a clay control agent, and a scale inhibitor.

5. The method of claim 1 further comprising:
   adding a gel breaker activator to the aqueous fluid after adjusting the pH to about 9 to about 10.

6. The method of claim 1 further comprising:
   adding a gel stabilizer to the aqueous fluid after adjusting the pH to about 9 to about 10.

7. The method of claim 1, wherein the aqueous fluid having the crosslinked-CMHPG dispersed therein at about 200° F. maintains an apparent viscosity of about 200 cP or greater at a constant shear rate of 40 $s^{-1}$ for about 45 minutes or greater.

8. The method of claim 1, wherein the aqueous fluid having the crosslinked-CMHPG dispersed therein at about 200° F. maintains an apparent viscosity of about 200 cP or greater at a constant shear rate of 40 $s^{-1}$ for about 75 minutes or greater.

9. The method of claim 1, wherein the aqueous fluid having the crosslinked-CMHPG dispersed therein at about 300° F. maintains an apparent viscosity of about 200 cP or greater at a constant shear rate of 40 $s^{-1}$ for about 75 minutes or greater.

10. The method of claim 1, wherein the aqueous fluid having the crosslinked-CMHPG dispersed therein at about 300° F. maintains an apparent viscosity of about 200 cP or greater at a constant shear rate of 40 $s^{-1}$ for about 120 minutes or greater.

11. The method of claim 1 further comprising:
    introducing the crosslinked-CMHPG dispersed in the aqueous fluid into a wellbore penetrating a subterranean formation.

12. The method of claim 1, wherein the crosslinker activator comprises sodium octaborate, potassium metaborate, or any combination thereof.

13. The method of claim 1, wherein the gel breaker comprises peroxides, persulfates, perborates, oxyacids and oxyanions of halogens, enzymes breakers, or any combination thereof.

14. A method comprising:
    hydrating a gelling agent comprising carboxymethyl hydroxypropyl guar (CMHPG) in an aqueous fluid having a total dissolved solids concentration of about 30,000 ppm or greater and a pH of about 6.5 to about 7.5;
    adjusting the pH of the aqueous fluid to about 9.0 to about 9.5;
    then, adding a crosslinker activator, a gel breaker, and zirconate crosslinker to the aqueous fluid to yield a crosslinked-CMHPG; and
    introducing the crosslinked-CMHPG dispersed in the aqueous fluid into a wellbore penetrating a subterranean formation.

15. The method of claim 14, wherein the CMHPG in the aqueous fluid having a pH of about 6.5 to about 7.5 is at a concentration of about 0.1% to about 10% by weight of the aqueous fluid.

16. The method of claim 14, wherein the zirconate crosslinker is at a concentration of about 0.001% to about 1% by weight of the aqueous fluid.

17. The method of claim 14 further comprising:
    adding proppant particulates to the aqueous fluid comprising the crosslinked-CMHPG.

18. The method of claim 14, wherein the wellbore has a bottom hole static temperature of about 200° F. or greater.

19. The method of claim 14, wherein the wellbore has a bottom hole static temperature of about 300° F. or greater.

* * * * *